(12) United States Patent
Li et al.

(10) Patent No.: US 10,970,876 B2
(45) Date of Patent: Apr. 6, 2021

(54) METHODS AND APPARATUS FOR IMAGE LOCATING RELATIVE TO THE GLOBAL STRUCTURE

(71) Applicant: PANTON, INC., Houston, TX (US)

(72) Inventors: Saishi Frank Li, Sugar Land, TX (US); Princeton Lee, Sugar Land, TX (US)

(73) Assignee: Panton, Inc., Houston, TX (US)

( * ) Notice: Subject to any disclaimer, the term of this patent is extended or adjusted under 35 U.S.C. 154(b) by 22 days.

(21) Appl. No.: 16/212,288

(22) Filed: Dec. 6, 2018

(65) Prior Publication Data

US 2019/0180474 A1 Jun. 13, 2019

Related U.S. Application Data

(60) Provisional application No. 62/596,581, filed on Dec. 8, 2017.

(51) Int. Cl.
*G06K 9/00* (2006.01)
*G06T 7/73* (2017.01)
*G06T 7/33* (2017.01)
*G06F 3/0481* (2013.01)

(52) U.S. Cl.
CPC ............... *G06T 7/75* (2017.01); *G06T 7/337* (2017.01); *G06F 3/0481* (2013.01); *G06T 2207/10032* (2013.01); *G06T 2207/20016* (2013.01)

(58) Field of Classification Search
CPC . G06T 7/75; G06T 7/337; G06T 2207/10032; G06T 2207/20016; G06F 3/0481

USPC ................................................. 382/154, 156
See application file for complete search history.

(56) References Cited

U.S. PATENT DOCUMENTS

| | | | | |
|---|---|---|---|---|
| 9,836,885 | B1 * | 12/2017 | Eraker | G06Q 30/0623 |
| 2011/0211036 | A1 * | 9/2011 | Tran | G06F 3/005 |
| | | | | 348/14.08 |
| 2012/0086727 | A1 * | 4/2012 | Korah | G06F 3/03 |
| | | | | 345/633 |
| 2014/0333729 | A1 * | 11/2014 | Pflug | G06T 15/20 |
| | | | | 348/47 |
| 2016/0148417 | A1 * | 5/2016 | Kim | G06T 19/006 |
| | | | | 345/419 |
| 2016/0338613 | A1 * | 11/2016 | Beckers | A61B 5/7257 |
| 2018/0249298 | A1 * | 8/2018 | Jain | G06K 9/6267 |
| 2019/0000425 | A1 * | 1/2019 | Hu | A61B 8/5269 |
| 2019/0138194 | A1 * | 5/2019 | Ryan | G06F 16/958 |
| 2019/0271550 | A1 * | 9/2019 | Breed | G08G 1/147 |
| 2020/0035030 | A1 * | 1/2020 | Schradin | G06F 3/011 |
| 2020/0051225 | A1 * | 2/2020 | Barron | G06T 5/40 |

* cited by examiner

*Primary Examiner* — Marceau Milord
(74) *Attorney, Agent, or Firm* — Patterson + Sheridan, LLP (57) ABSTRACT

Certain aspects of the present disclosure relate to methods and apparatus for implementing image locating relative to a global structure. The method generally includes mapping one or more close-up images of a structure to a 3D model of the structure, and indicating, on an overview image of the structure, the location of the one or more close-up images based on the mapping.

15 Claims, 6 Drawing Sheets

METHODS AND APPARATUS FOR IMAGE LOCATING RELATIVE TO THE GLOBAL STRUCTURE

CLAIM OF PRIORITY UNDER 35 U.S.C. § 119

The present application for patent claims benefit of U.S. Provisional Patent Application Ser. No. 62/596,581, filed Dec. 8, 2017, assigned to the assignee hereof and hereby expressly incorporated by reference herein.

BACKGROUND

Field of the Disclosure

The present disclosure relates generally to imaging methods and systems, and more particularly, to methods and apparatus for locating an image relative to a global structure.

Description of Related Art

Structure surveys collect imagines using, for example, unmanned aerial vehicles (UAVs), which are commonly referred to as drones. These structure surveys are used to identify different features such as damage of the surveyed properties. In order to do so, close-up photos are taken to obtain high-resolution images that provide detailed textures. While it serves the purpose of the detailed review, such close-up photos may be difficult for users to identify where any particular close-up photo corresponds to on the structure.

Said another way, in some examples, an overall location of any one or more of the close-up photos which may show damage are difficult to ascertain from the close-up images alone. This is because many times these images only show a small portion of the overall surveyed structure and may further vary in orientation as well. Thus, without additional information, identifying the location of the image in the surveyed structure may be a computational and time-consuming endeavor. For example, when users attempt to locate specific damages on the roof of a structure, they may have to go back and forth between many pictures comparing them to one another to determine where in the overall structure they may be situated, which may be a very manual and sporadic process to conduct.

However, as the demand for improved surveys and image analysis continues to increase, there exists a desire for further improvements in image processing. Preferably, these improvements should be applicable to other related technologies and the devices and systems that employ these technologies.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages.

Certain aspects provide a method for implementing image locating relative to a global structure. The method generally includes mapping one or more close-up images of a structure to a 3D model of the structure, and indicating, on an overview image of the structure, the location of the one or more close-up images based on the mapping.

In one or more cases, mapping the one or more close-up images of the structure to the 3D model of the structure includes determining a portion of the 3D model and a position of the portion that corresponds to the one or more close-up images; and associating the one or more close-up images with the determined portion and position.

Aspects generally include methods, apparatus, systems, computer readable mediums, and processing systems, as described herein with reference to and as illustrated by the accompanying drawings.

To the accomplishment of the foregoing and related ends, the one or more aspects comprise the features hereinafter fully described and particularly pointed out in the claims. The following description and the annexed drawings set forth in detail certain illustrative features of one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Aspects of the present disclosure provide apparatus, methods, processing systems, and computer readable mediums for locating one or more images relative to a global structure.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In one or more cases, a 3D structure of a roof may be generated from drone images of the roof. Drone images are many times captured by a pilot, and analyzed by someone else. Many of the images acquired are often taken from a short ("close-up") distance from the roof in order for the picture to have enough granularity to examine the actual condition of the shingles (or tile, or slate, or metal, or etc.) on the roof.

These close-up images are useful for inspection as they provide greater detail than zoomed out views. However, many of these close-up images show only shingles, which gives detailed information of the condition of the shingles, but doesn't provide any information as to where on the room your image is of. For example, looking at any one 2D image, it may be unclear to a user if they are looking at the front side of the structure or the back side, and may also not be able to identify if the image is of a flatter sloped part of the roof or a higher sloped part.

Accordingly, one or more cases of the disclosure provide techniques for image mapping of the close-up images, which show a section of the surveyed structure (for example, a portion of the roof showing a section of shingles), to an overall global structure and overview image. The overview image is an image that shows the entire surveyed structure. In one or more cases, a management application, running in a server or in the cloud, receives video and/or images of a structure's exterior. For example, images and/or a video of the structure's exterior may be captured by a customer using his or her device (e.g., a phone or a UAV mounted camera) as the customer walks and/or flies their UAV around the structure, thereby providing a 360 degree view of the structure's exterior. In some cases, additional close-up images may be provided by zooming in or approaching the structure which may also provide different vantage points and improved feature detailing. In one or more cases, if the roof of the structure is suspected of having damages, additional photos or video from an elevated view may also be taken.

These images and/or video are used to generate a 3D structure. For example, in accordance with one or more cases, collected images taken of a structure may be input into a structure from motion model that processes the images to generate a 3D structure from the collected 2D image sequences that may be coupled with local motion signals. According to other cases, 3D model creation may be done using triangulation to generate a 3D model which depicts the structure, including any features but is not limited thereto. Triangulation works on the principle that a point's location in three-dimensional (3D) space can be recovered from images depicting that point from different angles. By repeating this process for multiple points, a 3D point cloud can be generated. Additional processing may be implemented that allows for the 2D images to be mapped to the structure using the 3D model and other available information.

Given the video and/or images of the structure's exterior, a management application may process the video and/or images to determine the presence of one or more features such as, for example, damage. Additionally, the management application may map one or more close-up images of the overall structure, for example, close-up images, to an overall 3D structure. In one or more cases, structure by motion may be used along with processed image sets, extracted from original images of the structure, with each of the image sets depicting a distinct portion of the structure, as well as image sets including structure/facets of the structure, and the management application may use such images to generate a 3D model and map 2D images to the 3D structure.

In one or more cases, the management application may additionally identify and determine properties of features such as damage points along with calculating the associated cost of repairs. In addition, the management application may generate and transmit to the customer's computer and/or handheld device a report detailing the location of a shown 2D image on the overall structure.

As will be appreciated by one skilled in the art, aspects of the present disclosure may be embodied as a system, method, apparatus, or computer program product. Accordingly, aspects of the present disclosure may take the form of an entirely hardware case, an entirely software case (including firmware, resident software, micro-code, etc.) or one or more cases t combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, radio frequency (RF), etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to one or more cases of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

One or more cases of the disclosure may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In the context of the present disclosure, a user may access applications (e.g., a management application) or related data available in the cloud. For example, a management application could execute on a computing system in the cloud and process videos and/or images to process image data as disclosed herein. Doing so allows a user to access this information from any computing system attached to a network connected to the cloud (e.g., the Internet).

Figure 1:
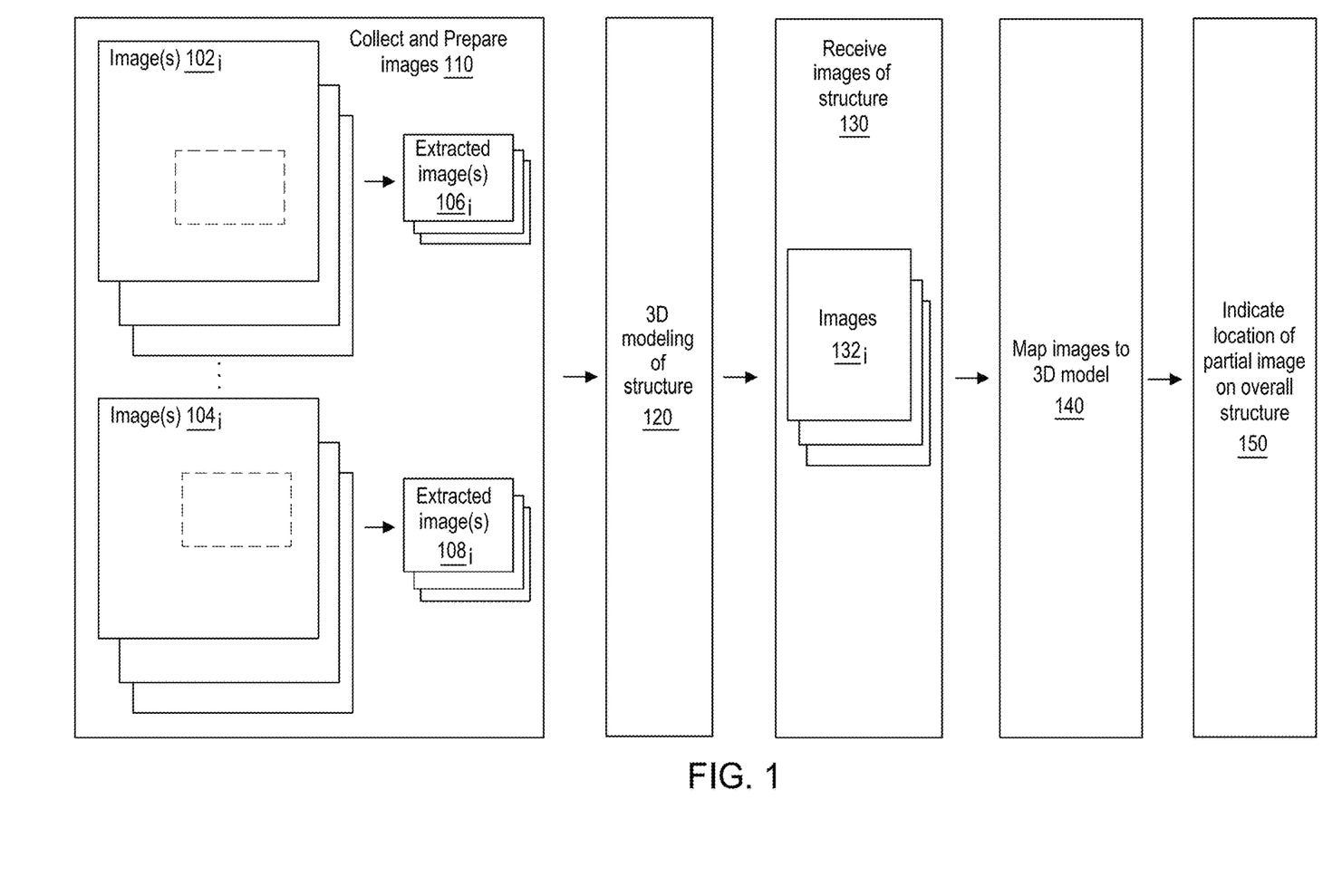
FIG. 1 is a diagram illustrating an approach for generating a mapping between close-up 2D images to an overall structure using a learning model, in accordance with certain aspects of the present disclosure.

Referring now to FIG. 1, a diagram illustrating an approach for locating an image relative to a global structure is shown. As shown, sets of images 102$i$ are collected and processed at 110. Images 104$i$ may also be collected and prepared at 110. Although shown as distinct sets of images 102$i$ and 104$i$, it should be understood that some or all of the images in the sets of images 102$i$ and 104$i$ may have overlap. In one or more cases, the images 102$i$ and 104$i$ may include images of a structure, such as images depicting close-up images 102$i$ or images depicting overview images 104$i$ of the entire structure. The sets of images 106$i$ and 108$i$ may be processed versions of the images 102$i$ and 104$i$, which have undergone segmentation, boundary detection, or some other processing. Each of the sets of images 106$i$ and 108$i$ may depict a distinct view of the features and location of the structure as shown in portions of the images 102$i$ and 104$i$.

At 120, a 3D modeling of the structure may be generated using images 102$i$ and 104$i$ and/or the extracted images 106$i$ and 108$i$ that include additional information and processing relating to the structure. Once generated, such 3D models may be processed along with images 132$i$ which may include new close-up images and/or may include any one or more of the images 102$i$, 104$i$, 106$i$, or 108$i$. For example, the processing may include adding textures to the 3D models using the images 132$i$.

At 130, images 132$i$ of a structure's exterior are received by a management application. In one or more cases, such images may include frames from a video recording or still shots taken by a user using a drone mounted camera flown around the structure. Further, a user may also provide additional images by using his or her handheld device to record a video of the structure while walking around the structure, with such a video providing a 360-degree view of the structure's exterior. An application running in the user's handheld device may then transmit the recorded video to the management application which runs in a server or in the cloud. Although discussed herein primarily with respect to such a video, it should be understood that other images capturing a 360-degree view of the structure exterior or even more may be employed in alternative cases. For example, in other cases, images may be taken at certain intervals as the drone or user travels in proximity of the structure, a panoramic image may be taken as the user walks around the structure, etc.

At 140, the management application maps some or all of the received images 132*i* by mapping close-up images from the set of images 132*i* to overview images and/or 3D model(s) of the structure. It should be understood that not all of the received images 132*i* need to be used, as the received images 132*i* may depict overlapping portions of the structure that are also depicted in other images. In one or more cases, a set of non-overlapping images 104*i* may be selected from the received images 102*i* as the input images 132*i*. Given the input images, the management application may output locations (e.g., in the form of bounding boxes or feature lines) of identified features in an overview image that correspond to the close-up image shown adjacent to the overview image.

At 150, the management application may determine location estimates of the close-up images. Bounding boxes or other visual highlights identifying the locations of the close-up images may be determined based on a measurement made directly from the images, from additional related information collected along with the image, and/or from images with a known relation to other images in the image set. For example, the management application may first segment the received images 132*i*, or a subset of such images, into images that depict an overview of the entire structure. Then, the management application may determine a location of close-up images within at least one of the overview images and/or 3D model.

Figure 2:
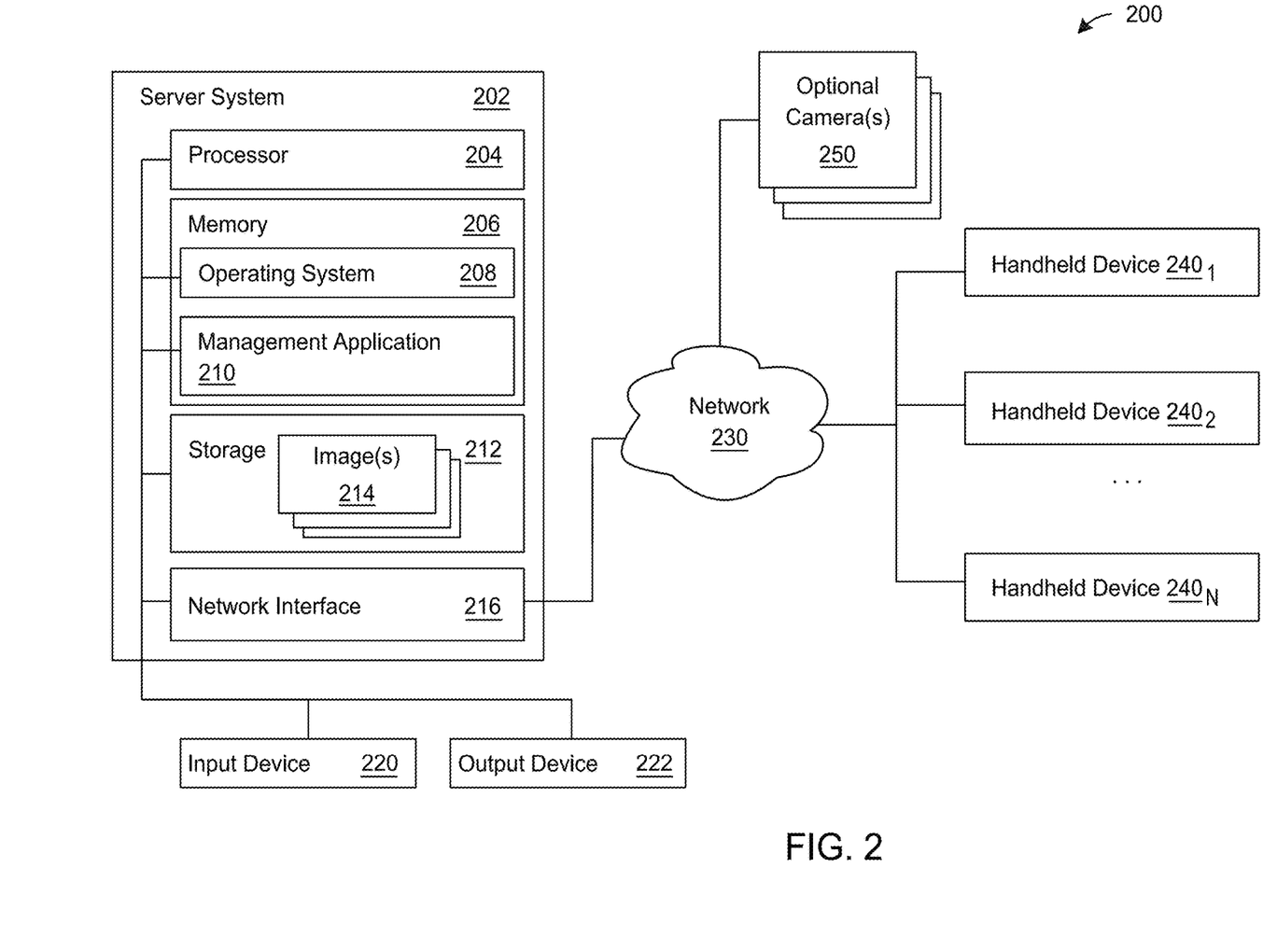
FIG. 2 illustrates a system configured to map close-up images to 3D structures and indicate on an overview image the location of the close-up images, in accordance with certain aspects of the present disclosure.

FIG. 2 illustrates a system 200 configured to collect and process image data of structures, according to one or more cases. As shown, the system 200 includes a server system 202 that is connected to handheld devices 2401-N and cameras 2501-N via a network 230. In general, the network 230 may be a telecommunications network and/or a wide area network (WAN). In one or more cases, the network 230 is the Internet.

The server system 202 generally includes a processor 204 connected via a bus to a memory 206, a network interface device 216, a storage 212, an input device 220, and an output device 222. The server system 202 is under the control of an operating system 108. Examples of operating systems include the UNIX® operating system, versions of the Microsoft Windows® operating system, and distributions of the Linux® operating system. More generally, any operating system supporting the functions disclosed herein may be used. The processor 204 is included to be representative of a single central processing unit (CPU), multiple CPUs, a single CPU having multiple processing cores, eon or more graphics processing units (GPUs), some combination of CPU(s) and GPU(s), and the like. The memory 206 may be a random access memory. The network interface device 216 may be any type of network communications device allowing the server system 202 to communicate with the handheld devices 2401-N via the network 130.

The input device 220 may be any device for providing input to the server system 202. For example, a keyboard and/or a mouse may be used. The output device 222 may be any device for providing output to a user of the server system 202. For example, the output device 222 may be any conventional display screen or set of speakers. Although shown separately from the input device 220, the output device 222 and input device 220 may be combined. For example, a display screen with an integrated touch-screen may be used.

Illustratively, the memory 206 includes a management application 210. The management application 210 provides a software application configured to receive video and/or images from a mobile application running in a UAV/drone-mounted camera 250 and/or in handheld devices 240*i* and process the video and/or images to generate a 3D model and map 2D images to locations on the structure using the 3D model. In one or more cases, the management application 210 is configured to receive videos and/or images captured using the mobile application and show an overview image of the structure, as well as close-up images of the structure captured using the mobile application showing indications of where the close-up image is located on the overview image. Illustratively, storage 212 includes image(s) 214, which is representative of images and/or videos captured by the mobile application running in the UAV/drone-mounted camera 250 and/or handheld devices 2401-N and transmitted to management application 210 that then persists such images and/or video as the image(s) 214 in a database in the storage 212.

In addition to persisting image(s) 214 in the storage 212, management application 210 is further configured to process some or all of the received images taken of a structure by inputting those images into a structure from motion model. In one or more cases, the structure from motion processing may be used to generate a 3D structure from 2D image sequences with may be coupled with local motion signals. Additional processing may be implemented that allows for the 2D images to be mapped to the structure using the 3D model and other available information. The management application 210 may then generate and transmit a report to a customer's handheld device 240 (and/or other parties, such as an insurance company or a customer's computer or a web portal) indicating, e.g., the location of the close-up image on the overview image or 3D model of the structure in addition to showing the close-up image itself. In one or more cases, subsequent to transmitting the report to the customer's handheld device 240, the management application 210 may also notify an insurance company's personnel or repair company's personnel that the structure has been imaged and processed.

Regarding 3D model creation, in accordance with one or more cases, the management application 210 may use, for example, triangulation to generate a 3D model which depicts the structure, including any features but is not limited thereto. Triangulation works on the principle that a point's location in three-dimensional (3D) space can be recovered from images depicting that point from different angles. In one or more cases, management application 210 may determine portions of frames of a video captured by the customer that overlap and recover the 3D locations of points in those overlapping portions. In particular, the management application 210 may compute features (e.g., color, shape, thickness, etc.) of each of the points in the video frames and determine matching points across video frames based on matching features of those points. In one or more cases, Random Sample Consensus (RANSAC) features may be computed. Having determined the location of a given point in at least three image/video frames, the management application 210 may then use triangulation to determine that point's location in 3D space. By repeating this process for multiple points, the management application 210 may generate a 3D point cloud. In one or more cases, the management application 210 may further add texture to the 3D point cloud by extracting the texture and color of each of the points and averaging over neighboring points.

Although discussed herein primarily with respect to the management application's 210 interactions with applications running in the customers' handheld devices 240i, it should be understood that management application 210 may also provide a platform that other parties can interact with. For example, the management application 210 may also permit insurance carriers to log in and view structure feature reports and cost estimates (if created), similar to the reports transmitted to the customers' handheld devices 240i. As another example, the management application 210 may also permit insurance adjusters or repair company employees, as opposed to customers themselves, to capture videos and/or images of structures that are transmitted and processed by management application 210. In such a case, the management application 210 may further provide a user interface (e.g., a web-based interface) that the insurance adjusters, owners, or repair company employees can use to enter notes and other information that the management application 210 may incorporate into structure damage and cost estimate reports. As yet another example, the management application 210 may also permit contractors such as repair centers to view information on damages to the structure that the contractors are asked to repair.

Figure 3:
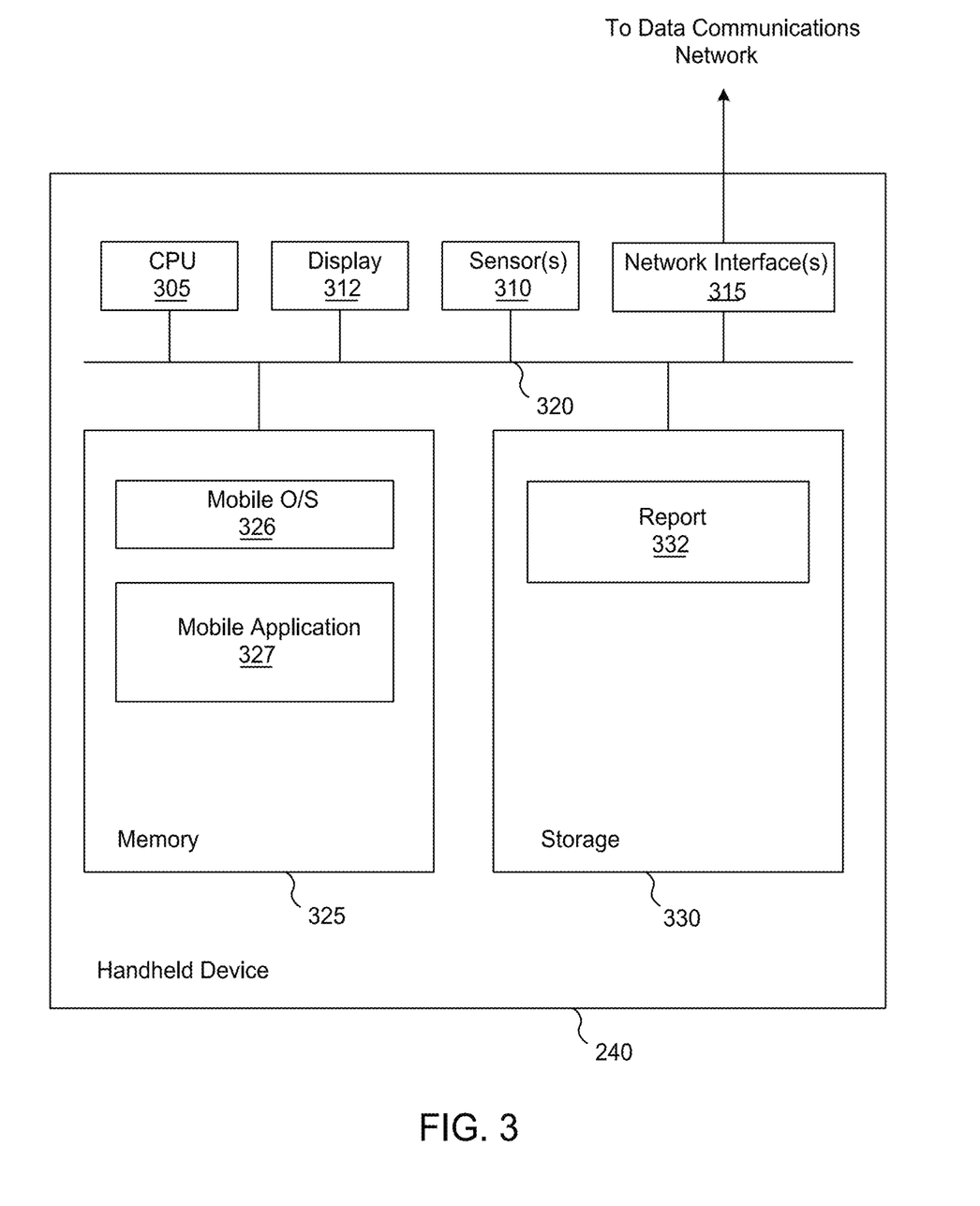
FIG. 3 illustrates an example of a handheld device, in accordance with certain aspects of the present disclosure.

FIG. 3 illustrates an example of a mobile device 240, according to one or more cases. In this example, the mobile device 240 is presumed to be a handheld telephone with a touch-sensitive display 312 and sensors(s) 310, including a camera. Of course, one or more cases of the disclosure may be adapted for use with a variety of computing devices, including personal digital assistants (PDAs), tablet computers, digital cameras, UAVs, drones, wearable electronics, user equipment, and other devices having a camera that can capture images and/or videos and network connectivity.

As shown, the mobile device 240 includes, without limitation, a central processing unit and graphics processing unit (CPU/GPU) 305, network interface(s) 315, an interconnect 320, a memory 325, and storage 330. In addition, the hand device includes a touch-sensitive display 312 and sensor(s) 310. The sensor(s) 310 may be hardware sensors or software sensors, or sensors which include both hardware and software. In one or more cases, the sensor(s) 310 include one or more cameras that provide charge-coupled device (CCD) device(s) configured to capture still-images and videos. Other sensors that mobile device 240 may include may acquire data about, e.g., the device's position, orientation, and the surrounding environment, among other things. For example, the mobile device 240 may include a global positioning system (GPS) component, proximity sensor(s), microphone(s), accelerometer(s), magnetometers(s), thermometer(s), pressure sensor(s), gyroscope(s), and the like.

The CPU/GPU 305 retrieves and executes programming instructions stored in the memory 325. Similarly, the CPU/GPU 305 stores and retrieves application data residing in the memory 325. The interconnect 320 is used to transmit programming instructions and application data between the CPU/GPU, storage 330, network interfaces 315, and memory 325. The CPU/GPU 305 is included to be representative of a single CPU, multiple CPUs, a single CPU having multiple processing cores, and the like. And the memory 325 is generally included to be representative of a random access memory. Storage 330, such as a hard disk drive or flash memory storage drive, may store non-volatile data.

Illustratively, the memory 325 includes a mobile operating system (O/S) 326 and an application 327. The mobile O/S 326 provides software configured to control the execution of application programs on the handheld device. The mobile O/S 326 may further expose application programming interfaces (APIs) which can be invoked to determine available device sensors, collect sensor data, and the like. The mobile application 327 is configured to run on the mobile O/S 326. For example, a customer may download the mobile application 327 when he or she wants to inspect their structure (or at some other time), with a unique identifier (ID) being assigned to the customer and/or structure. The mobile application 327 may provide logistical aid to the customer during the image capture process. For example, the mobile application 327 may receive, from the management application 210 when a customer requests to book a drone image collection appointment, photos of the structure, positioning information, and the like. The mobile application 327 displays such received information to the customer to help him or her locate the close-up image location on the overall structure.

Of course, one of ordinary skill in the art will recognize that the handheld device 240 is provided as a reference example and that variations and modifications are possible as well as other devices, e.g., computing tablets with cameras or digital cameras that the customer may use to capture images and/or videos showing 360 degree views of the structure.

Figure 4A:
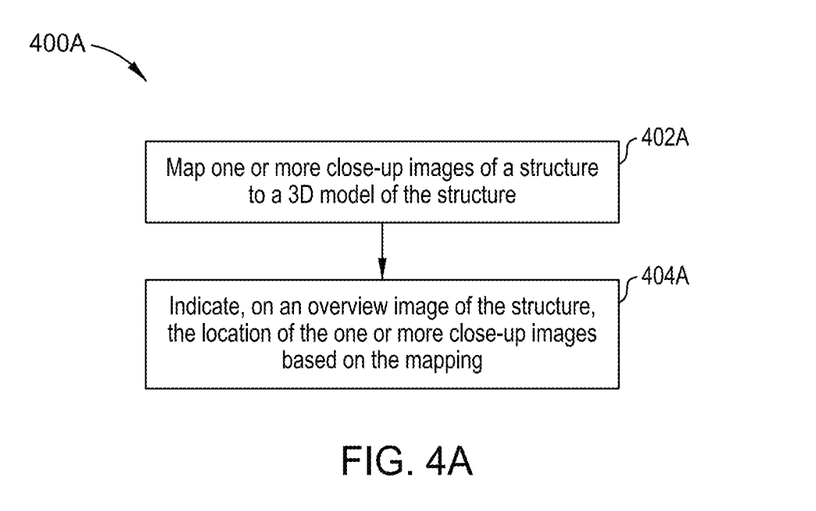
FIG. 4A illustrates a method for processing image data, in accordance with certain aspects of the present disclosure.

FIG. 4 illustrates a method 400 for implementing image locating relative to a global structure. The method includes, at operation 402, mapping one or more close-up images of a structure to a 3D model of the structure. The method 400 may further include, at operation 404, indicating, on an overview image of the structure, the location of the one or more close-up images based on the mapping.

In accordance with one or more cases, the method may further include presenting both the one or more close-up images of the structure and the overview image of the structure in a same interface with the location of the one or more close-up image in the overview image.

In accordance with one or more cases, the method may further include collecting the one or more close-up images using an image sensor mounted on an unmanned aerial vehicle (UAV). The method may also include generating a user interface that includes at least one of the close-up images and the overview image indicating the location of the at least one close-up image. Further, the method may include displaying the user interface.

In accordance with one or more cases, the method may further include indicating, on a visual representation of the 3D model of the structure, the location of the one or more close-up images based on the mapping. In one or more cases, the method may further include generating a user interface that includes the visual representation of the 3D model of the structure, at least one of the close-up images, and the overview image. The visual representation of the 3D model and the overview image may indicate the location of the at least one close-up image.

In accordance with one or more cases, the method may further include generating the 3D model based on at least the one or more close-up images and the overview image.

In accordance with one or more cases, the method may further include implementing segmentation to break the structure into small structures or facets. The method may also include generating corresponding boundaries between the small structures or facets based on the segmentation. In one or more cases, the method may further include calculating one or more properties of the small structures or facets corresponding to the 3D model of the structure. The one or more properties may include one or more of structure boundary, plane properties, measurement properties, and/or location properties.

In one or more cases, the method may further include projecting the structure boundary of one or more small structures or facets onto at least one of the close-up images or overview image. In some cases, the method may further include filtering out the structure boundary of one or more small structures or facets from the overview image such that only those structure boundaries visible in a select one of the close-up images are shown in the overview image.

Although described herein primarily with respect to photographic cameras, in other cases, other types of cameras may be used in lieu of or in addition to photographic cameras. For example, thermal camera(s) may be used in one or more cases to capture the heat signature and thermal escapes of a structure. Certain heat signatures may indicate damage or insulation gaps in a structure.

Although described herein primarily with respect to housing structures, it should be understood that techniques disclosed herein may also be applicable to industrial, commercial, and other types of structures.

The flowchart and block diagrams in the Figures illustrate the architecture, functionality, and operation of possible implementations of systems, methods, and computer program products according to various cases of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed concurrently, or the blocks may sometimes be executed in the reverse order or out of order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to one or more cases of the present disclosure, other and further cases of the disclosure may be devised without departing from the basic scope thereof, and the scope thereof is determined by the claims that follow.

For example, in accordance with one or more cases, a combination of a series of information technologies may be implemented to provide image locating relative to a global structure. For example, initially, one or more 3D models may be created from a number of 2D images. Particularly, in one or more cases, one may use structure from motion to estimate 3D structures from 2D image sequences which may be further coupled with local motion signals.

In some cases, a mapping that may indicate a relationship between 2D images and its 3D locations may be generated. For example, using one or more 3D structures, segmentation may be implemented to break the structure into small structures/facets and the corresponding boundary may be generated. Calculation of each small structure/facet's plane property in 3D may in implemented.

Further, projecting each structure boundary into each of the 2D images may also be provided. Based on the one or more 3D structures and each structure/facet's plane property, a filtering out of only those boundaries visible in each of the 2D images may be implemented. For example, from a 2D image (where the detailed damage is located) a program may determine a 3D projection, from which the program, in turn, may find a 2D image's position in an "overview" 2D image, and outline such a position.

Additionally, in an interested 2D image, based on a 3D structure and structure/facet's plane property, one may project the structure/facet boundaries of those parts that are within the image, back to a 3D structure and then project back to "overview" image.

Figure 5A:
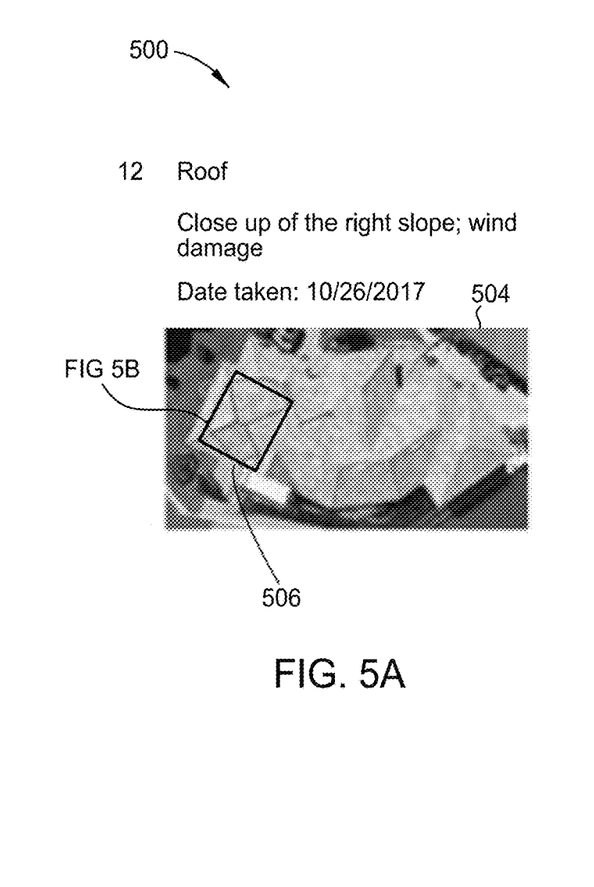
FIG. 5A illustrates an example user interface, in accordance with certain aspects of the present disclosure.
Figure 6:
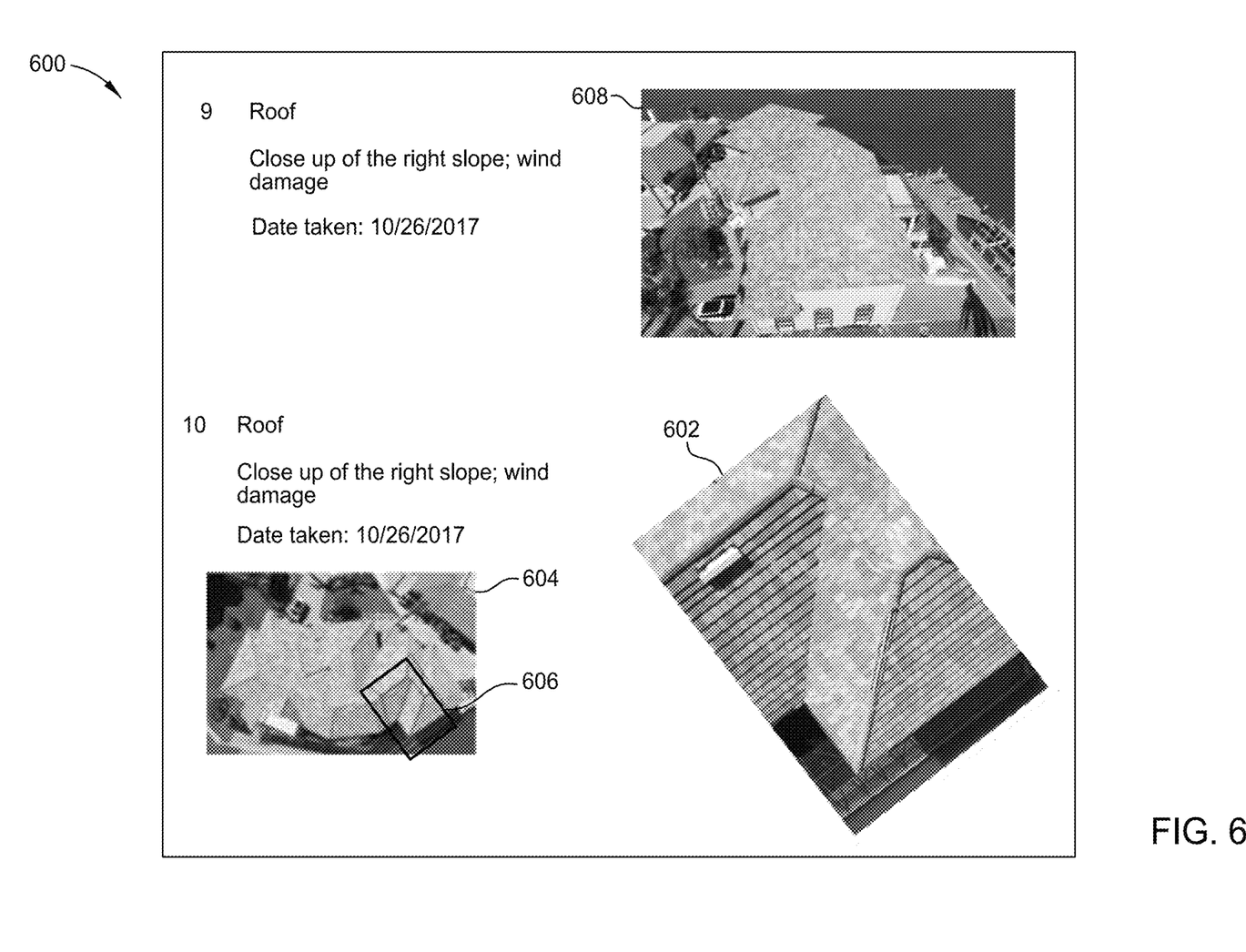
FIG. 6 illustrates another example user interface, in accordance with certain aspects of the present disclosure.

For example, FIG. 5A illustrates an example user interface 500, in accordance with certain aspects of the present disclosure. In accordance with another example, FIG. 6 illustrates another example user interface 600, in accordance with certain aspects of the present disclosure. As shown in these figures, when a program creates a "Damage Report", the program may present such correspondence clearly for people's review.

Figure 5B:
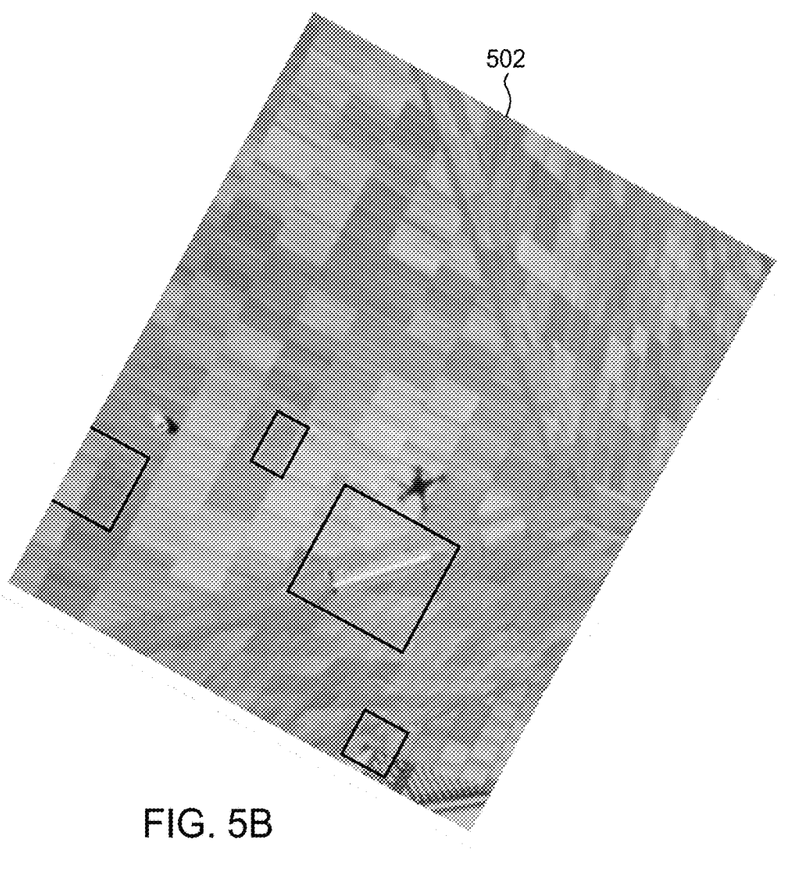
FIG. 5B illustrates an example user interface, in accordance with certain aspects of the present disclosure.

Looking specifically at FIG. 5B, a user interface may include a display area 502 that disclose a close-up image of a structure. Additionally, the user interface 500, of FIG. 5A, may include an overview image 504 of the structure from which the close-up image is from. The overview image 504 may include a visual indicator 506 that shows where the close-up image in the display area 502, of FIG. 5B, is located in the overall overview image 504. The user interfaces of FIGS. 5A and 5B may be displayed separately or together. Turning now to FIG. 6, the user interface 600 may further display a 3D model of the structure 608 in addition to a close-up image 602 and an overview image 604 that includes the visual indicator 606 of the close-up image 602 placement.

In one or more cases, a user can select a particular close-up image for viewing in the display area 502. In one example, the user may be provided with a position of the visual indicator 506 on the overview image 504 that corresponds to that particular close-up image that is being displayed.

Advantageously, in accordance with one or more aspects as discussed herein, a net result that may be provided include the ability to make the damage identification much easier and intuitive. Additionally, location recognition of any image is quickly identified by the provided overview mapping to the shown 2D image, examples of which are shown in FIGS. 5 and 6.

One or more advantages and/or benefits may be provided by the disclosed embodiments, cases, and examples provided herein. For example, tremendous commercial value may be provided because one or more of the disclosed cases herein may help a user decipher relative location of an image, which is useful when there are many local images that are similar in overall nature without giving a clear picture of the overall idea.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c). As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." For example, the articles "a" and "an" as used in this application and the appended claims should generally be construed to mean "one or more" unless specified otherwise or clear from the context to be directed to a singular form. Unless specifically stated otherwise, the term "some" refers to one or more. Moreover, the term "or" is intended to mean an inclusive "or" rather than an exclusive "or." That is, unless specified otherwise, or clear from the context, the phrase, for example, "X employs A or B" is intended to mean any of the natural inclusive permutations. That is, for example the phrase "X employs A or B" is satisfied by any of the following instances: X employs A; X employs B; or X employs both A and B. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

Figure 4B:
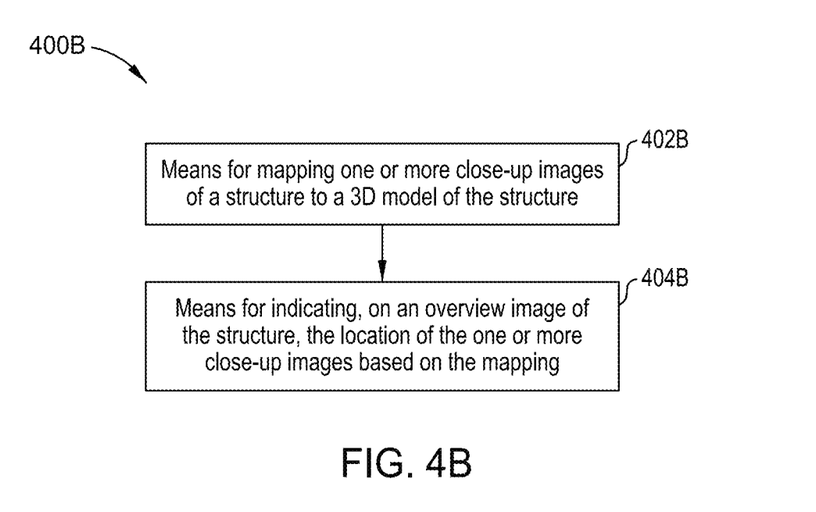
FIG. 4B illustrates example components capable of performing the operations shown in FIG. 4A.

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering. For example, operations 400A illustrated in FIG. 4A correspond to means 400B illustrated in FIG. 4B. For example, means for transmitting and/or means for receiving may comprise one or more of a processor 204, a network interface, and other components of the server system 202 and/or the optional camera(s) 250, or handheld device(s) 240 including one or more components shown in FIG. 3, input device 220, or output device 222. Additionally, means for mapping, means for indicating, means for determining, means for associating, means for presenting, means for collecting, means for generating, means for displaying, means for implementing, means for calculating, means for projecting, and/or means for filtering may comprise one or more processors, such as the components in the server system 202 and/or the optional camera(s) 250, or handheld device(s) 240 including one or more components shown in FIG. 3, input device 220, or output device 222.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the physical (PHY) layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates the transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, phase change memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into the cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects, computer-readable media may comprise non-transitory computer-readable media (e.g., tangible media). In addition, for other aspects, computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for performing the operations described herein and illustrated in the appended figures.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes, and variations may be made in the arrangement, operation and details of the methods and apparatus described above without departing from the scope of the claims.

What is claimed is:

1. A method for image locating relative to a global structure, the method comprising:
    mapping one or more close-up images of a structure to a 3D model of the structure;
    implementing segmentation to break the structure into small structures or facets;
    generating corresponding boundaries between the small structures or facets based on the segmentation;
    calculating one or more properties of the small structures or facets corresponding to the 3D model of the structure, wherein the one or more properties include one or more of structure boundary, plane properties, measurement properties, or location properties; and
    indicating, on an overview image of the structure, a location of the one or more close-up images based on the mapping.

2. The method of claim 1, wherein mapping the one or more close-up images of the structure to the 3D model of the structure comprises:
    determining a portion of the 3D model and a position of the portion that corresponds to the one or more close-up images; and
    associating the one or more close-up images with the determined portion and position.

3. The method of claim 1, further comprising:
    presenting both the one or more close-up images of the structure and the overview image of the structure in a same interface with the location of the one or more close-up image in the overview image.

4. The method of claim 1, further comprising:
    collecting the one or more close-up images using an image sensor mounted on an unmanned aerial vehicle (UAV);
    generating a user interface that includes at least one of the close-up images and the overview image indicating the location of the at least one close-up image; and
    displaying the user interface.

5. The method of claim 1, further comprising:
    indicating, on a visual representation of the 3D model of the structure, the location of the one or more close-up images based on the mapping; and generating a user interface that includes the visual representation of the 3D model of the structure, at least one of the close-up images, and the overview image, wherein the visual representation of the 3D model and the overview image indicate the location of the at least one close-up image.

6. The method of claim 1, further comprising:

generating the 3D model based on at least the one or more close-up images and the overview image.

7. The method of claim 1, further comprising:

projecting the structure boundary of one or more of the small structures or facets onto at least one of the close-up images or overview image.

8. The method of claim 7, further comprising:

filtering out the structure boundary of one or more small structures or facets from the overview image such that only those structure boundaries visible in a select one of the close-up images are shown in the overview image.

9. An apparatus for image locating relative to a global structure, comprising:

means for mapping one or more close-up images of a structure to a 3D model of the structure;

means for implementing segmentation to break the structure into small structures or facets;

means for generating corresponding boundaries between the small structures or facets based on the segmentation;

means for calculating one or more properties of the small structures or facets corresponding to the 3D model of the structure, wherein the one or more properties include one or more of structure boundary, plane properties, measurement properties, or location properties; and means for indicating, on an overview image of the structure, the location of the one or more close-up images based on the mapping.

10. The apparatus of claim 9, wherein the means for mapping the one or more close-up images of the structure to the 3D model of the structure comprises:

means for determining a portion of the 3D model and a position of the portion that corresponds to the one or more close-up images; and means for associating the one or more close-up images with the determined portion and position.

11. The apparatus of claim 9, further comprising:

means for presenting both the one or more close-up images of the structure and the overview image of the structure in a same interface with the location of the one or more close-up image in the overview image.

12. The apparatus of claim 9, further comprising:

means for collecting the one or more close-up images using an image sensor mounted on an unmanned aerial vehicle (UAV);

means for generating a user interface that includes at least one of the close-up images and the overview image indicating the location of the at least one close-up image; and means for displaying the user interface.

13. The apparatus of claim 9, further comprising:

means for indicating, on a visual representation of the 3D model of the structure, the location of the one or more close-up images based on the mapping; and means for generating a user interface that includes the visual representation of the 3D model of the structure, at least one of the close-up images, and the overview image, wherein the visual representation of the 3D model and the overview image indicate the location of the at least one close-up image.

14. The apparatus of claim 9, further comprising:

means for generating the 3D model based on at least the one or more close-up images and the overview image.

15. The apparatus of claim 9, further comprising:

means for projecting the structure boundary of one or more small structures or facets onto at least one of the close-up images or overview image; and means for filtering out the structure boundary of one or more small structures or facets from the overview image such that only those structure boundaries visible in a select one of the close-up images are shown in the overview image.

* * * * *